United States Patent [19]
Rosenthal et al.

[11] 3,807,151
[45] Apr. 30, 1974

[54] GUARD PLATE CONSTRUCTION FOR TRIMMER-EDGERS

[75] Inventors: Francis Joseph Rosenthal, Fork; Stephen Jeffrey Ehrlich, Randallstown; Patrick Enright Lynch, Jr., Baltimore, all of Md.

[73] Assignee: The Black and Decker Manufacturing Company, Towson, Md.

[22] Filed: Jan. 2, 1973

[21] Appl. No.: 320,064

[52] U.S. Cl.................... 56/16.9, 56/255, 56/320.1
[51] Int. Cl............................................ A01d 35/20
[58] Field of Search ......... 56/320.1, 255, 256, 17.1, 56/17.4, 17.5, 16.7, 17.2, 16.9, 320.2

[56] References Cited
UNITED STATES PATENTS

| | | | |
|---|---|---|---|
| 2,867,960 | 1/1959 | Stiles et al. | 56/17.2 |
| 3,034,275 | 5/1962 | Happe et al. | 56/17.5 X |
| 3,330,102 | 7/1967 | Shuman, Jr. | 56/16.9 |

*Primary Examiner*—Russell R. Kinsey
*Attorney, Agent, or Firm*—Joseph R. Slotnik

[57] ABSTRACT

A trimmer-edger including a housing supported for movement by wheels and having an upstanding control handle. The housing encloses a motor and defines a cutting chamber in which a motor driven, rotary blade is disposed. A swing-away guard plate is carried by the housing and covers the cutting chamber. The guard plate is manually releasable for swing-away movement thereby permitting debris removal from the cutting chamber, as well as blade removal and/or replacement.

7 Claims, 7 Drawing Figures

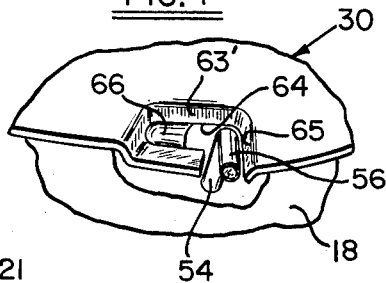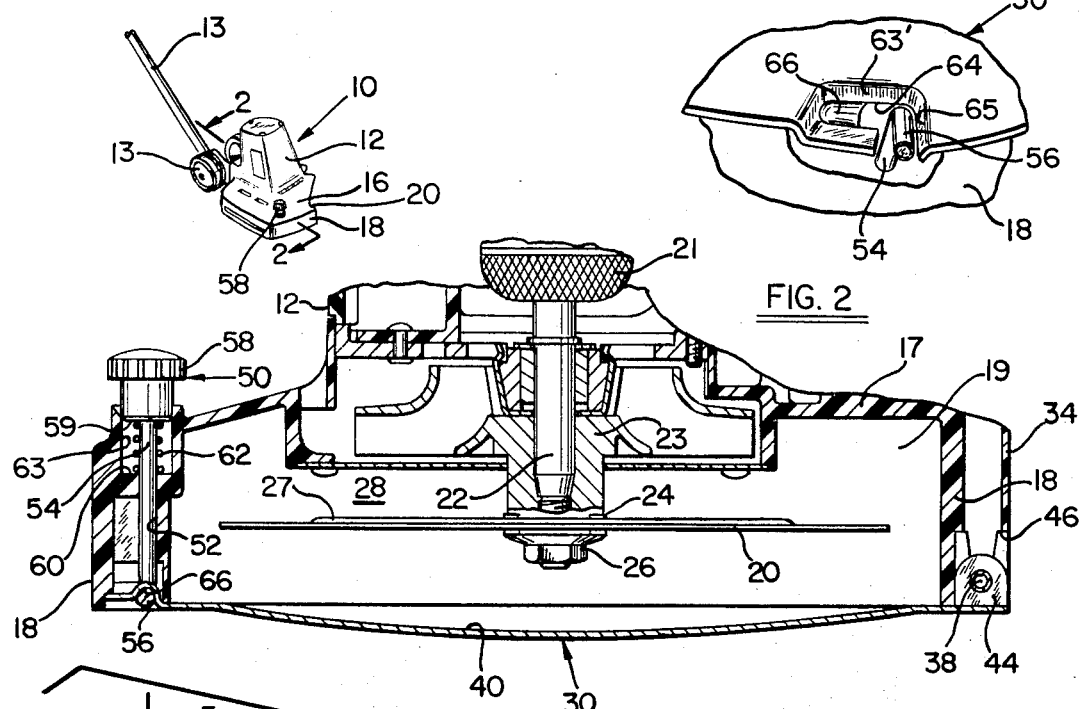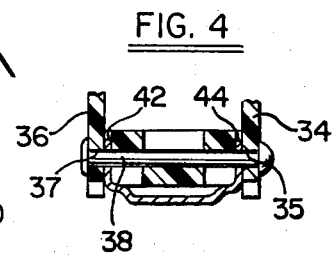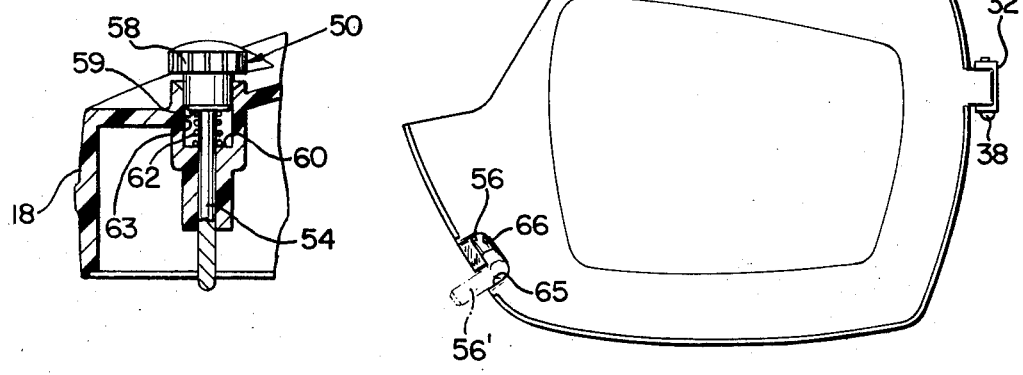

3,807,151

GUARD PLATE CONSTRUCTION FOR TRIMMER-EDGERS

BACKGROUND OF THE INVENTION

1. Field of the Invention

This invention relates generally to power operated lawn edging or trimming tools, and more particularly to a swing-away guard plate incorporated on the housing thereof and combining with the housing to define an enclosed cutting chamber in which a rotary blade is disposed.

2. General Background

Powered lawn trimmers, edgers, or trimmer-edgers of the type referred to require continuing maintenance in that the rotating blade is subject to wear and must be sharpened or replaced. In addition, debris, i.e., grass, dirt, etc., accumulates on the walls of the cutting chamber and builds up around the blade shaft and must be removed in order to maintain the efficiency and effectiveness of the device. It is customary to provide a screw-attached guard plate for the cutting chamber that must be removed in order to gain access to the blade or clean out the debris accumulating therein.

In addition to the time involved in removing and replacing these conventional guard plates, the screws can become lost and the screw openings clogged with dirt. These problems detract from the ease of use and care of the device and require special tools.

SUMMARY OF THE INVENTION

Primary objects of the invention are to provide a swing-away guard plate for a powered trimmer, edger, or combination trimmer-edger or the like, which makes it simple to clean the cutting chamber where debris accumulates; which permits ready access to the blade for purposes of removal, sharpening and/or replacement; and in which the guard plate is retained in place on the trimmer-edger housing by a readily accessible and easily manipulated latch.

Further important objects of this invention are to provide a novel assembly of the above character which is relatively inexpensive to manufacture, rugged in construction, and reliable and safe in use.

These, together with other and more specific objects and advantages will become apparent from a consideration of the following description when taken in conjunction with the drawing forming a part thereof, in which:

BRIEF DESCRIPTION OF THE DRAWING

FIG. 1 is a perspective view of a trimmer-edger incorporating the invention with a portion of the manipulating handle removed;

FIG. 2 is an enlarged sectional view taken substantially along the line 2—2 of FIG. 1 and showing the guard plate of this invention in closed position;

FIG. 3 is a view similar to FIG. 2 with intermediate portions removed, showing the guard plate open;

FIG. 4 is a fragmentary section taken substantially along line 4—4 of FIG. 3, showing the hinged connection of the guard plate to the housing in detail;

FIG. 5 is a sectional view taken substantially along the line 5—5 of FIG. 3;

FIG. 6 is a bottom plan view of the guard plate, showing in solid lines the position of the latch when the guard plate is closed, and showing in phantom lines how the latch is oriented to swing the guard plate open; and FIG. 7 is an enlarged perspective view of a portion of FIG. 6 showing the latch released.

DESCRIPTION OF THE PREFERRED EMBODIMENT

Referring to the drawing in detail and first considering FIG. 1, a trimmer-edger, one type of device with which the present invention finds use, is indicated generally at 10 and comprises a motor housing 12 supported by wheels 13 and pivotally secured to an operator-controlled handle 13 extending upwardly therefrom. A blade housing 16 is fixed to or rigid with motor housing 12 and has a base 17 and a partial skirt 18 defining a cutting cavity 19 (see FIG. 2). A motor 21 in the housing 12 has an output shaft 22 extending through the base 17 into cavity 19 and has a fan hub 23 and a blade 20 fixed thereto by a fastener 26. If desired, blade 20 may have fins 27 for desired air flow characteristics. A guard plate 30 engages skirt 18 and covers a major portion of cavity 19, leaving the blade 20 to protrude through an opening defined by an interruption in skirt 18. Thus, when motor 21 is energized, blade 20 rotates and performs "trimming," defined as cutting while rotating through a horizontal plane, or "edging" defined as cutting while rotating through a vertical plane. This is achieved by rotating the motor and blade housings 12, 16 substantially 90° relative to the handle 13.

It will be appreciated that during use of devices of the type referred to, rotation of the blade 20 generates air flow within the cavity 19 causing grass cuttings, dirt, and other debris to accumulate and build up on the walls of the cutting cavity 19 and around the hub 23. If unattended, this can result in reduced efficiency of the device and overload and damage to the motor.

Many prior art units include a detachable cover plate secured in place by screws or the like. However, to remove these cover plates requires a screwdriver which quite often is not readily accessible. Furthermore, removing these screws particularly when the device is on the ground and outdoors can result in loss of the screws and in dirt clogging the screw openings. The ultimate result has been that debris has been allowed to accumulate excessively, or that the cover plates are improperly replaced or not replaced at all after debris removal.

The present invention overcomes these problems by providing a novel guard plate arrangement by which the guard plate is permanently attached and cannot be removed from the unit, but which is quickly and easily opened for debris removal, blade sharpening and/or replacement, and then is quickly reclosed and secured for safe unit operation. Furthermore, this novel assembly is such that operation of the unit is inhibited and impractical unless the guard plate is properly secured in position for safe use of the tool.

The blade housing 16 is provided with a pair of spaced parallel ribs 34, 36 having transversely aligned apertures 35, 37. The guard or skid plate 30 includes a dished central portion 40 and at one edge has a pair of depending ears 42, 44 adapted to fit between ribs 34, 36. The ears 42, 44 have transversely aligned openings 43, 45 which align with openings 35, 37 to receive a rivet 38 or other connector to permanently connect the plate 30 to the housing 16. Thus, the guard plate 30 can pivot from a closed operating position, shown in FIG.

2, to an open position, shown in FIG. 3, where the cutting chamber 19 is completely accessible for cleaning out debris, etc., and the blade 20 may be removed for resharpening and/or can be replaced.

A manually-releasable latch assembly, indicated generally at 50, is provided to releasably retain the guard plate 30 in the closed position. This latch assembly 50 includes an elongated bolt 54 slidably extending through a bore 52 in housing 16 and terminating in a laterally extending latch arm 56. The upper end of the bolt 54 has a knob 58 (preferably knurled) secured thereto and readily accessible for manual grasping at the upper surface of the housing 16. A compression spring 62 is caged between a surface 59 on knob 58 and a radial surface 60 adjacent bore 52 to normally urge the latch bolt 54 in an upward direction, as seen in FIGS. 2, 3 and 5. However, a counterbore 63 allows the bolt 54 (and knob 58) to be moved downwardly against the force of spring 62 from the position shown in FIG. 2 to the position shown in FIG. 3.

The bolt 54 extends into an L-shaped slot 64 formed in an indent 63' in the guard plate 30. The plate 30 is formed with a pocket or recess 66 adjacent the slot 64 adapted to receive the latch arm 56 of bolt 54 when the plate 30 is closed, as shown in FIG. 2 and in solid lines in FIG. 6. Thus, in this position of the parts, the guard plate 30 shields the blade 20 for normal operation of the device. In addition, the latch arm 56 is wholly within the indent 63 in the plate 30 so as to not inhibit movement of the device over the ground.

However, when it is desired to remove debris from the walls of the cutting chamber 19, or from around hub 23, or to remove the blade for sharpening and or replacement, the user, by means of knob 58, depresses the bolt 54 against the force of spring 62 to move the latch arm 56 clear of pocket 66 and turns the bolt substantially through 90° to position latch arm 56 against shoulder 65 on plate 30. In this position, shown in FIGS. 3 and 7, and in broken lines in FIG. 6, latch arm 56 is aligned with notch 64 and when released, rests on the edge of skirt 18 so that guard plate 30 can now be freely swung open to fully expose chamber 19. Thereafter, guard plate 30 is swung back to the closed position and relatched by reversing the described movement of latch bolt 54.

It will be appreciated that since the guard plate 30 is permanently retained on housing 16, it will be virtually impossible to use the device 10 with the plate 30 open. This greatly adds to the safety of the device. Further, unlocking of the latch assembly 50 required two movements of the bolt 54, i.e., depressing and turning, and accordingly accidental depression of the knob 58 will not "unlock" the guard plate since it must be accompanied by subsequent rotation of the knob. Thus, compound movement is required to release the guard plate for pivotal movement and access to the area in which it rotates within the housing for cleaning, removal of the blade, sharpening, etc.

By the foregoing, there has been disclosed a novel guard plate construction for use with trimmer-edgers or the like, and while a preferred embodiment has been illustrated and described in detail, various additions, substitutions, modifications and omissions may be made thereto without departing from the spirit of the invention.

What is claimed is:

1. In a power-operated cutter assembly for edging, trimming, or the like comprising in combination a housing constructed for movement along the ground, a handle extending upwardly from said housing and facilitating manual control and manipulation of said housing along the ground; a blade mounted in a cavity in said housing, a guard plate disposed at one side of the blade for protecting against accidental contact with the blade or leaving the blade exposed; the improvement including means pivotally mounting said guard plate on said housing for movement outwardly therefrom for permitting ready access to the blade in said cavity for cleaning out of accumulated debris and changing and/or sharpening the blade, manually releasable latch means including cooperating portions on said housing and said guard plate for retaining the guard plate in a normal fixed protecting relation on said housing and overlaying said cavity, said latch means comprising a rotatable bolt having a terminal, lateral abutment, said guard plate having a slot portion opening into one edge thereof and through which said bolt extends and through which said lateral abutment will pass, said guard plate including a lateral recess communicating with said slot and opening toward an outer surface portion of said guard plate for receiving the lateral abutment therein when said guard plate is secured against pivotal movement.

2. The structure as claimed in claim 1 in which spring means is interposed between said bolt and said housing for normally urging said lateral abutment into engagement with said lateral recess.

3. The structure as claimed in claim 2 in which said bolt is of such a length to permit it to be depressed and rotated against the action of said spring means for removing the lateral abutment out of the recess and into alignment with said slot portion whereby the guard plate can be pivoted away from said housing.

4. The structure as claimed in claim 3 in which said housing includes a depending skirt having a lower edge upon which said guard plate is normally disposed in guarding relation, said skirt including a pair of spaced panel portions, said guard plate including integral pivot-ear elements, and a pivot pin extending transversely through said panel portions and pivot-ear elements and retaining the parts in assembled relation.

5. A power-operated trimming or edging tool comprising: a housing including a rotatable blade, a skirt substantially enclosing said blade, a guard plate pivotally mounted at one side of said skirt on a transverse axis of rotation for movement outwardly from said housing and manually-releasable latch means including cooperating means on said housing and said guard plate for normally retaining the guard plate in juxtaposed relation to said blade, said latch means comprising a tunnel portion in said housing, a bolt element journaled for rotation and longitudinal displacement in said tunnel, said bolt element including an operating knob exposed at the exterior of said housing, spring means interposed between said tunnel and said operating knob for normally urging the operating knob away said guard plate, said guard plate including a slot opening into one edge thereof and through which said bolt projects, said bolt terminating in a lateral latch portion movable relative to said slot for permitting the guard plate to move thereby, said guard plate including a recess on an outer surface portion thereof communicating with said slot and substantially conforming to the lateral latch portion of said bolt for receiving the lateral latch portion for retaining the guard plate against pivotal movement.

6. A power-operated tool for trimming, edging, or the like comprising a housing supported for movement along the ground, a motor on said housing and drivingly engaging a rotary blade, an upstanding handle connected to said housing for control and manipulation of said tool, said blade rotating in a cavity defined by walls of said housing and normally closed by a cover plate, said cover plate having an exterior surface formed with a recess and being pivotally connected to said housing for movement away therefrom for exposing said blade and said cavity, an operable latch means interconnecting said cover plate to said housing opposite said pivot, said latch including manually operable means carried by said housing and receivable in said cover plate recess to releasably retain said cover plate closed against said housing walls.

7. A power-operated tool for trimming, edging, or the like comprising a housing supported for movement along the ground, a motor on said housing and drivingly engaging a rotary blade, an upstanding handle connected to said housing for control and manipulation of said tool, said blade rotating in a cavity defined by walls of said housing and normally closed by a cover plate, said cover plate having an exterior surface formed with a recess and being pivotally connected to said housing for movement away therefrom for exposing said blade and said cavity, operable latch means interconnecting said cover plate to said housing opposite said pivot, said latch including manually operable means carried by said housing and receivable in said cover plate recess to releasably retain said cover plate closed against said housing walls, said manually operable latch means including a spring biased plunger slidably disposed on said housing and having a portion recievable in said recess in said cover plate for securely retaining said cover plate in position closing said cavity.

* * * * *